United States Patent
Deutschmann et al.

(10) Patent No.: US 11,447,089 B2
(45) Date of Patent: Sep. 20, 2022

(54) AIRBAG ASSEMBLY WITH REACTION SURFACE

(71) Applicant: TOYODA GOSEI CO., LTD., Aichi-Ken (JP)

(72) Inventors: Roy P. Deutschmann, South Lyon, MI (US); Alexandra Marie Lazaros, Livonia, MI (US); Roland Dominic Furtado, Novi, MI (US); Srinivas Krishnan, Troy, MI (US)

(73) Assignee: TOYODA GOSEI CO., LTD.

( * ) Notice: Subject to any disclaimer, the term of this patent is extended or adjusted under 35 U.S.C. 154(b) by 64 days.

(21) Appl. No.: 16/998,644

(22) Filed: Aug. 20, 2020

(65) Prior Publication Data

US 2021/0053525 A1    Feb. 25, 2021

Related U.S. Application Data (60) Provisional application No. 62/890,905, filed on Aug. 23, 2019.

(51) Int. Cl.
| | | |
|---|---|---|
| *B60R 21/216* | (2011.01) | |
| *B60R 21/205* | (2011.01) | |
| *B60R 21/2334* | (2011.01) | |
| *B60R 21/2155* | (2011.01) | |

(52) U.S. Cl.
CPC .......... *B60R 21/216* (2013.01); *B60R 21/205* (2013.01); *B60R 21/2155* (2013.01); *B60R 21/2334* (2013.01); *B60R 2021/2161* (2013.01)

(58) Field of Classification Search
CPC .. B60R 21/205; B60R 21/216; B60R 21/2155
See application file for complete search history.

(56) References Cited

U.S. PATENT DOCUMENTS

| | | | |
|---|---|---|---|
| 5,306,042 | A | 4/1994 | Frank |
| 5,306,043 | A | 4/1994 | Mihm et al. |
| 5,322,324 | A | 6/1994 | Hansen et al. |
| 5,360,231 | A | 11/1994 | Adams |
| 5,385,366 | A | 1/1995 | Frank et al. |
| 5,447,327 | A | 9/1995 | Jarboe et al. |
| 6,082,760 | A | 7/2000 | Ukai et al. |
| 6,464,255 | B1 | 10/2002 | Preisler et al. |
| 6,955,376 | B1 | 10/2005 | Labrie et al. |
| 7,104,566 | B2 | 9/2006 | Pinsenschaum et al. |
| 7,354,060 | B2 | 4/2008 | Thomas |

(Continued)

FOREIGN PATENT DOCUMENTS

| | | |
|---|---|---|
| DE | 19826734 B4 | 8/2007 |
| EP | 0364714 A2 | 4/1990 |

(Continued)

*Primary Examiner* — Barry Gooden, Jr.
(74) *Attorney, Agent, or Firm* — Carlson, Gaskey & Olds, P.C.

(57) ABSTRACT

A vehicle occupant restraint system includes an airbag cushion. A reaction surface is configured to move between a retracted position and a deployed position upon deployment of the airbag cushion, such that the reaction surfaces will direct the airbag cushion toward an occupant area upon deployment of the airbag cushion. Multiple embodiments of reaction surfaces are disclosed, including deployable instrument panel sections, flexible straps, and hoods.

19 Claims, 8 Drawing Sheets

(56) References Cited

U.S. PATENT DOCUMENTS

| | | | |
|---|---|---|---|
| 7,625,007 B2 | 12/2009 | Sekizuka | |
| 8,602,449 B2 | 12/2013 | Kojima | |
| 8,888,125 B2 | 11/2014 | Ory | |
| 10,946,825 B2 | 3/2021 | Ghannam et al. | |
| 2003/0193173 A1 | 10/2003 | Mori et al. | |
| 2012/0049497 A1* | 3/2012 | Enders | B60R 21/216 |
| | | | 280/743.1 |

FOREIGN PATENT DOCUMENTS

| | | |
|---|---|---|
| EP | 0558271 A1 | 9/1993 |
| EP | 1951560 B1 | 6/2008 |
| FR | 2914892 A1 | 10/2008 |
| FR | 2947226 A1 | 12/2010 |
| FR | 2941193 B1 | 9/2012 |
| JP | 5891696 B2 | 3/2016 |

* cited by examiner

AIRBAG ASSEMBLY WITH REACTION SURFACE

BACKGROUND

This disclosure relates generally to vehicle airbag systems.

Airbags protect vehicle occupants as is known. Airbags are used together with other vehicle safety systems, such as seatbelts. A driver airbag is typically mounted to the steering wheel. A passenger airbag may be mounted in the dashboard.

The shape and position of dashboards in vehicle designs, such as autonomous vehicle designs, have been proposed where the dashboard is lower and/or further from the passenger. Further, in some newer designs, again particularly autonomous vehicle designs, the windshield is further from the passenger.

SUMMARY

A vehicle occupant restraint system provides a reaction surface for a deployed airbag where there is no naturally-existing reaction surface in sufficient proximity, such as a windshield, seatback, door trim, etc.

A vehicle occupant restraint system includes an airbag cushion configured to deploy into an interior of the vehicle. A deployable reaction surface is configured to deploy upon deployment of the airbag cushion to direct the airbag cushion toward the occupant area. Multiple embodiments of reaction surfaces are disclosed, including deployable instrument panel sections, telescoping rods, flexible straps, and fabric hoods.

A method for deploying an airbag cushion including the step deploying a reaction surface. An airbag cushion is deployed such that the airbag cushion contacts the reaction surface and is directed toward the occupant by the reaction surface.

Deploying the reaction surface may further include the step of moving the reaction surface from a retracted position to a deployed position.

DETAILED DESCRIPTION

Figure 1:
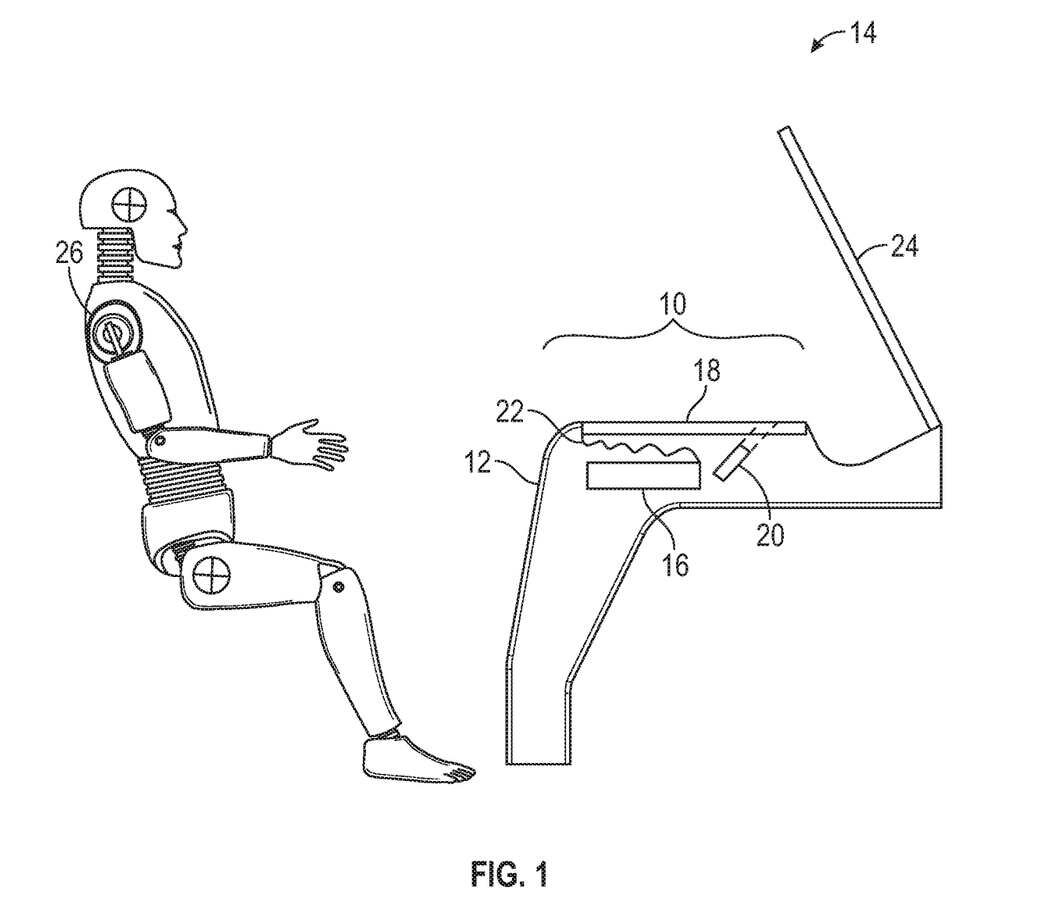
FIG. 1 a side view of a vehicle occupant restraint system according to a first embodiment.

A vehicle restraint system 10 is shown in FIG. 1 installed in a vehicle dashboard 12 (or overall instrument panel). The system 10 includes an airbag assembly 16 (containing a cushion, inflator, etc) installed in the dashboard 12 below a rigid panel, such as a section of Instrument Panel (IP) skin or panel 18. The IP panel 18 is pivotably connected at a forward end to the dashboard 12.

A pop-up hood lifter 20 is mounted to the dashboard 12 below the IP panel 18. The hood lifter 20 may be any device capable of pivoting open the IP panel 18 very rapidly, such as an actuator employing rapid combustion and expansion of gas to drive a rod connected to the IP panel 18. The hood lifter 20 may be similar to a seat belt pre-tensioner.

A flexible strap 22 or tether is secured at one end to the IP panel 18 proximate a rear end of the IP panel 18. The other end of the flexible strap 22 is secured to the dashboard 12 below the IP panel 18, such as to a fixed vehicle component. The system 10 is installed in the dashboard 12 between the occupant 26 and the windshield 24.

Figure 2:
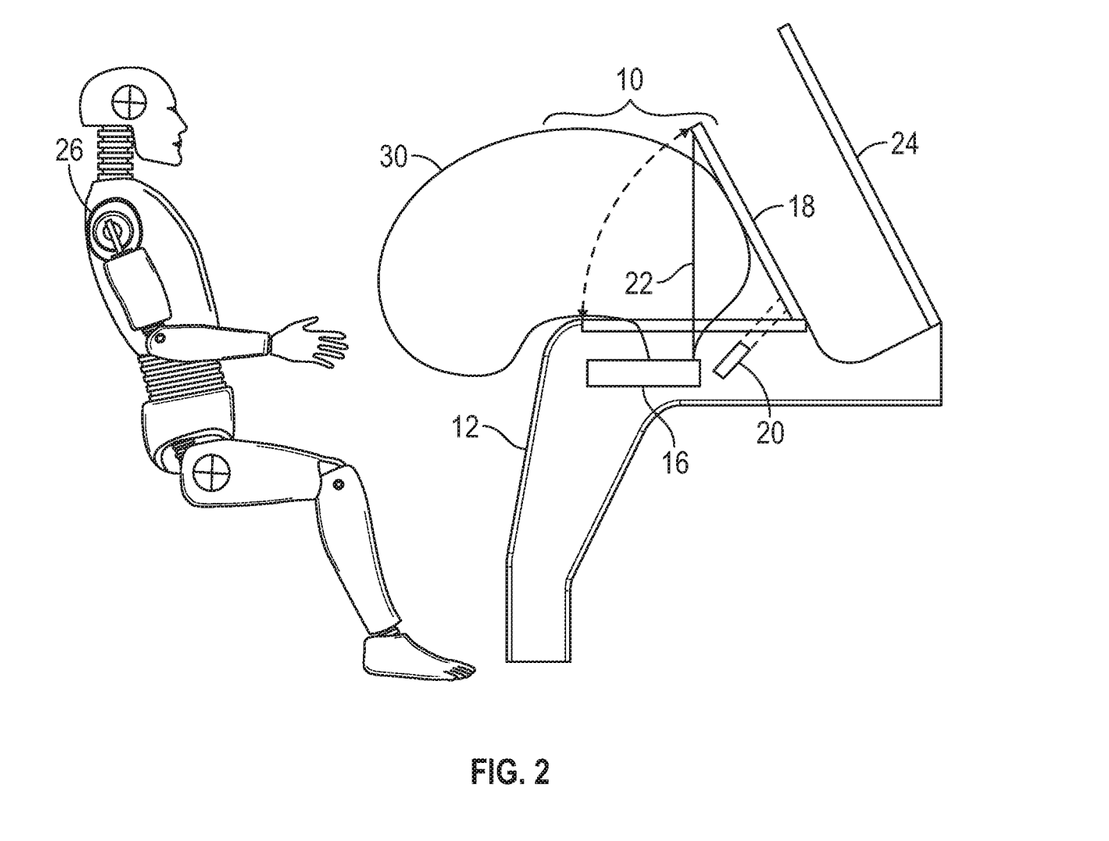
FIG. 2 shows the vehicle occupant restraint system of FIG. 1 during deployment.

FIG. 2 shows the system 10 in a deployed position. When it is determined that the airbag assembly 16 should be activated, the hood lifter 20 is activated. The hood lifter 20 may be activated prior to or simultaneously with the airbag assembly 16. The cushion 30 is inflated as the IP panel 18 swings upward and pulls the flexible strap 22 tight. The cushion 30 bears against the IP panel 18, which directs the cushion 30 toward the occupant 26. The IP panel 18 also provides a backing for the cushion 30 against which to bear in order to restrain relative forward motion of the occupant 26. Alternatively, the cushion 30 could bear against the flexible strap 22 or a flexible panel in place of the strap 22.

Figure 3:
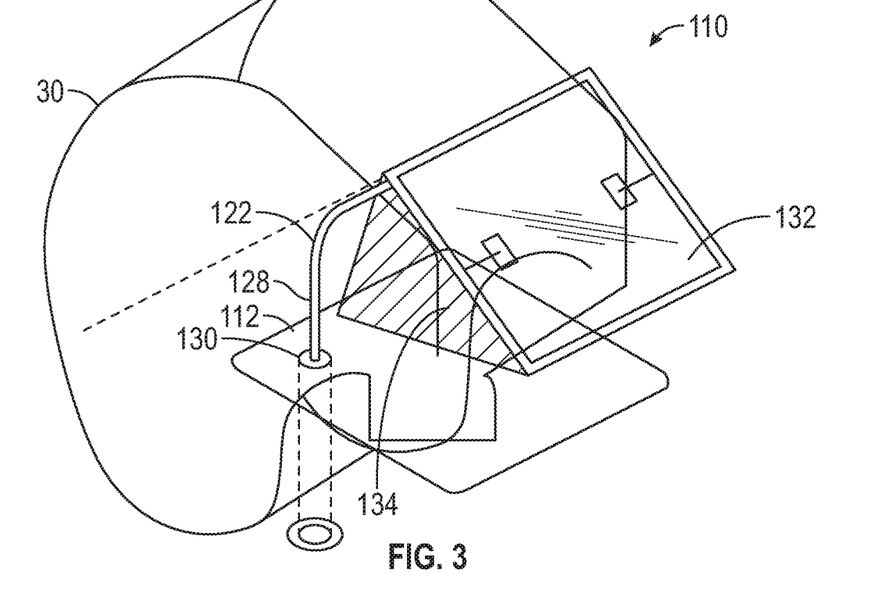
FIG. 3 shows a second embodiment of a vehicle occupant restraint system.

FIG. 3 shows a second embodiment of a vehicle occupant restraint system 110 mounted to an instrument panel 112. The vehicle occupant restraint system 110 includes reaction surface provided by a hood 122, which could include a front frame 128 to which a front panel 132 (or hood) and side panels 134 are secured. The front panel 132 side panels 134 can be a rigid material (e.g. thermoplastic elastomers, thermoplastic polyolefin elastomers, etc) or fabric. Alternatively, the front panel 132 and the side panel 134 can be molded integrally with the frame 128. Vertical portions of the frame 128 are received in channels 130 in the instrument panel 112. Upon deployment of the cushion 30, the hood 122 pivots upwardly to the position shown in FIG. 3. As shown, the hood 122 directs the cushion 30 toward the occupant area, away from the windshield (not shown) and provides a surface against which the cushion 30 can react.

Figure 4:
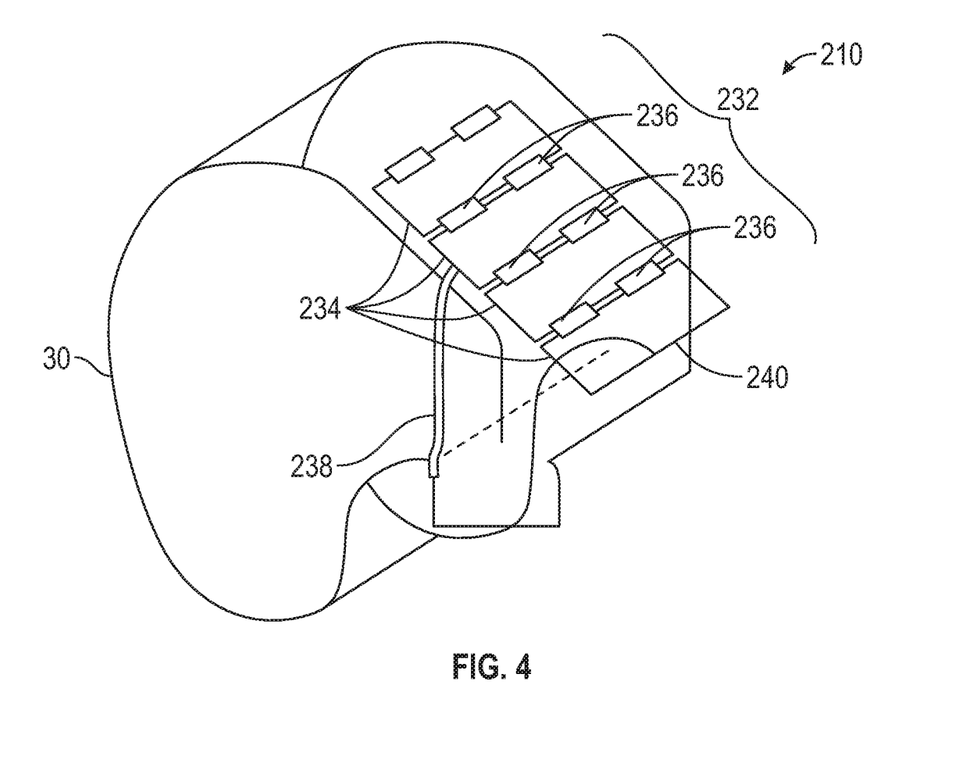
FIG. 4 shows a third embodiment of a vehicle occupant restraint system.

FIG. 4 shows a third embodiment of a vehicle occupant restraint system 210. The vehicle occupant restraint system 210 incudes a front panel 232 (or hood) comprising a plurality of rigid panels 234, which may be rigid plastic, joined by flexible straps 236, which allow the panel 234 to pivot relative to one another into a folded, pre-deployment position and then pivot outward and expand to a deployed position shown in FIG. 4. At least one of the panels 234 may be secured by anchor straps 238 or tethers to the instrument panel. As shown, upon deployment, the panels 234 are aligned substantially coplanar to one another to form the front panel 232 to form a reaction surface against which the cushion 30 can react. Again this directs more of the cushion 30 to the occupant area. In an optional configuration of this embodiment, one end of the panels 234 is attached to the main panel of the deploying airbag 30 thus pulling the extension panel to its extended position.

Figure 5:
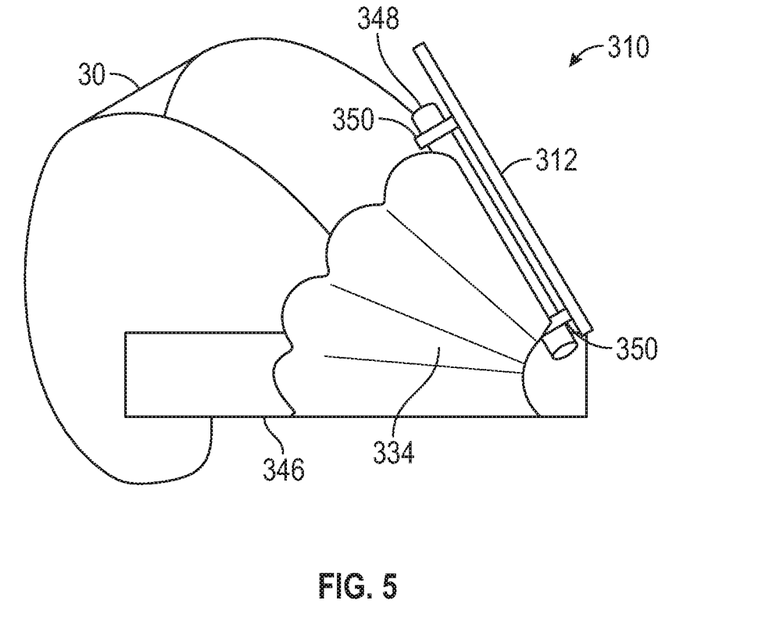
FIG. 5 shows a fourth embodiment of a vehicle occupant restraint system.

FIG. 5 shows a fourth embodiment of a vehicle occupant restraint system 310. The vehicle occupant restraint system 310 includes a pair of flexible side panels 344 each secured to a rod 348 which can be secured to a section of the instrument panel 312 by clips 350. The side panels 344 can be fabric or plastic. Preferably, the rods 348 can be snap fit into the clips 350. The section of the instrument panel 312 is pivoted upward relative to the base 346 during deployment of the cushion 30, as shown. Before deployment, the base 346 is positioned adjacent the rods 348 against the section of the instrument panel 312. The section of the instrument panel 312 and the side panels 344 pivot upward and provide reaction surfaces for the cushion 30 that are deployed with the deployment of the cushion.

Figure 6:
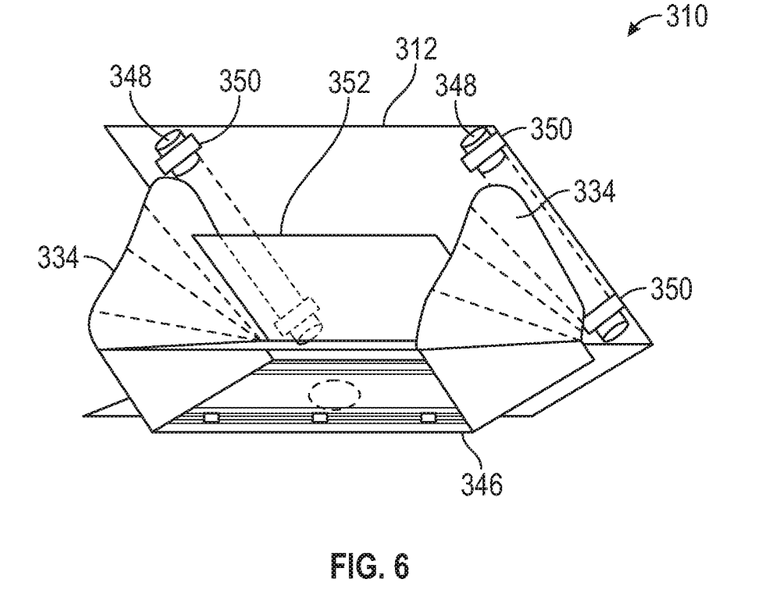
FIG. 6 is a front perspective view of the vehicle occupant restraint system of FIG. 5.

FIG. 6 is a front perspective view of the vehicle occupant restraint system 310 of FIG. 5. In this embodiment, an optional chute door 352 is provided between the side panels 334 and extends upward from the base 346.

Figure 7:
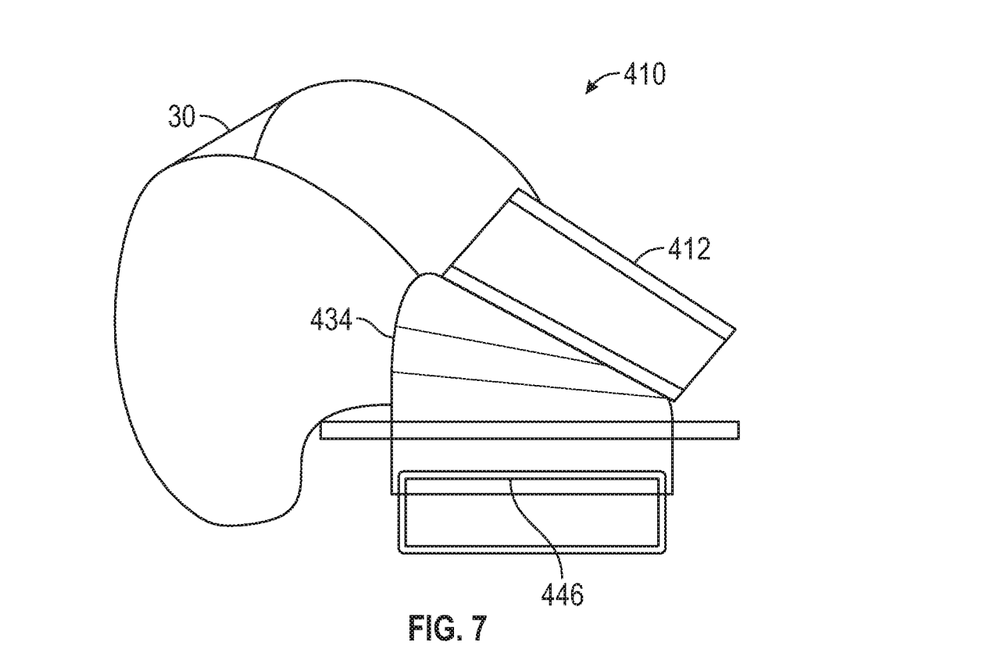
FIG. 7 shows a fifth embodiment of a vehicle occupant restraint system.

FIG. 7 shows a fifth embodiment of a vehicle occupant restraint system 410. The vehicle occupant restraint system 410 includes a pair of side panels 434 extending downward from the instrument panel 412 to a chute 446 (or hood or base). The instrument panel 412, the chute 446, and the side panels 434 provide reaction surfaces that direct the cushion 30 toward a passenger area.

Figure 8:
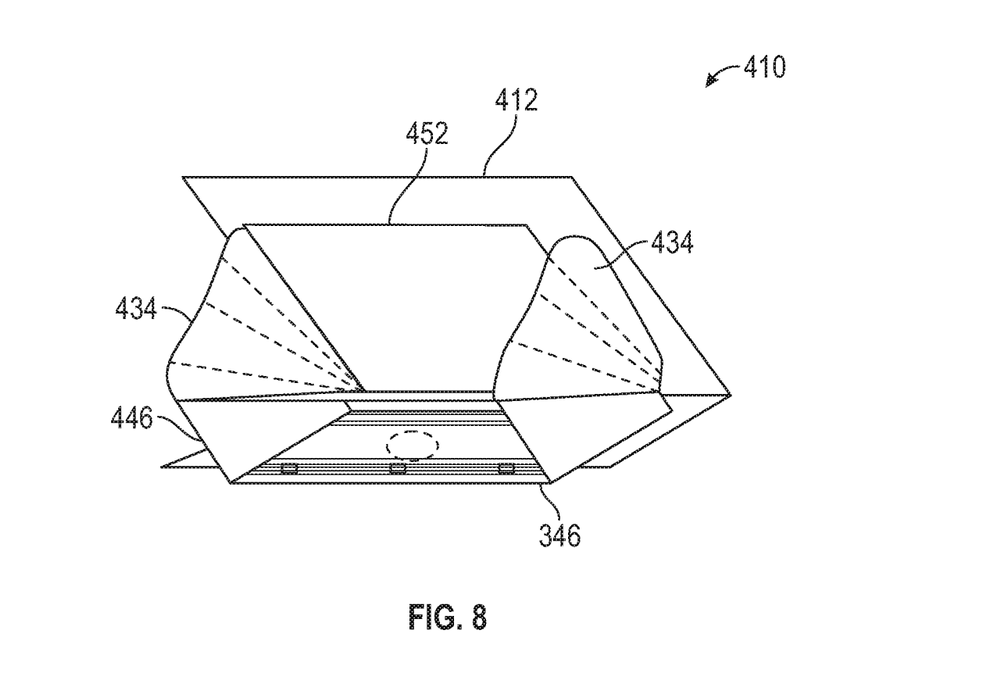
FIG. 8 is a front view of the vehicle occupant restraint system of FIG. 7.

FIG. 8 is a front view of the vehicle occupant restraint system 410 of FIG. 7. The chute door 452 (plastic or metal) in this embodiment provides the reaction surface to direct the deploying airbag 30.

Figure 9:
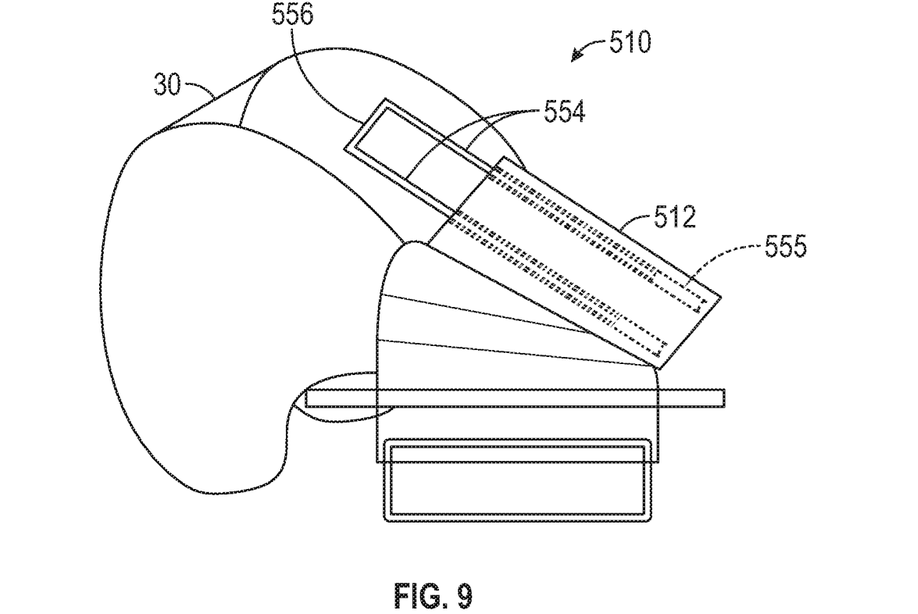
FIG. 9 shows a sixth embodiment of a vehicle occupant restraint system.

FIG. 9 shows a sixth embodiment of a vehicle occupant restraint system 510 secured to a section of instrument panel 512. A pair of sliding or telescoping rods 554 are received within channels 555 in the instrument panel 512 and then are partially ejected during deployment (such as by springs or expanding gas or by being secured to main panel of the airbag cushion 30) to provide a reaction surface for the cushion 30. The channels 555 could be slots or tubes, etc, anything in which the rods 554 could be slidably received. A cross rod 556 may connect outer ends of the rods 554. Prior to deployment, the rods 554 are fully or almost fully received within the channels 555. Just prior to or simultaneously with the activation of the cushion 30, the rods 554 are deployed to the position shown, such as by releasing a latch and permitting springs to force them out or by an expanding gas caused by combustion. Alternatively, collapsible rods can be used instead of telescoping rods. The collapsible rods would be folded, and held in place and the force of deployment by the airbag cushion would unfold the collapsible rods, which would then act as a reaction surface. Side panels 534 (fabric or rigid (plastic, TPO, TPE, etc.) similar to the embodiments of FIGS. 3-8) extend downward from the instrument panel 512 on either side of the cushion 30.

In an alternate embodiment, the cross rod 556 is attached to the main panel of the airbag cushion 30 and is pulled during deployment of the airbag cushion 30 to its extended, deployed position.

Figure 10:
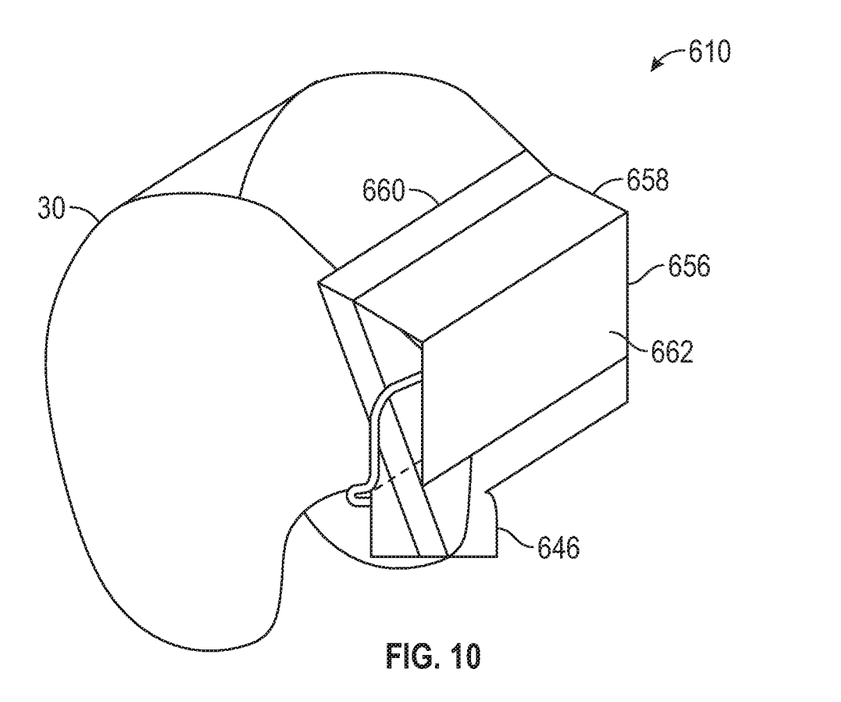
FIG. 10 shows a seventh embodiment of a vehicle occupant restraint system.
Figure 11:
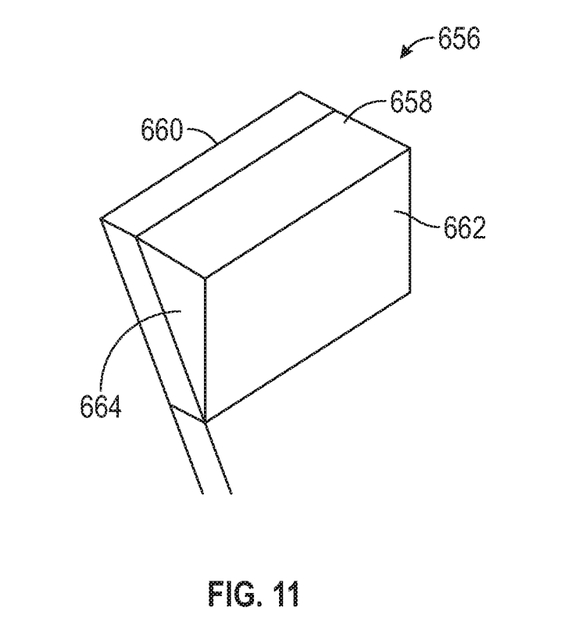
FIG. 11 shows the hood of the vehicle occupant restraint system of FIG. 10.

FIG. 10 shows a seventh embodiment for a vehicle occupant restraint system 610 including a hood 656. Referring to FIGS. 10 and 11, the hood 656 may comprise an upper panel 658 extending at an angle rearward from a front panel 662. Side panels 664 extend downward from each end of the upper panel 658 and connect to each end of the front panel 662 and may optionally be secured to the case 646. The upper panel 658 and front panel 662 may be fabric. The side panels 664 may be rigid panels, such as plastic, or alternatively could also be fabric.

A stiff strap 660 or tether, such as seatbelt webbing, is secured to the rearward end of the upper panel 658 of the hood 656 and to the lower end of the side panels 664. The lower end of the strap 660 is secured to a structure in the vehicle near the instrument panel. The hood 656 partially covers and traps the cushion 30 during deployment and directs the deployment of the cushion 30 toward the occupant. The strap 660 adds rigidity to prevent the cushion 30 and hood 656 from rotating away from the occupant.

Referring to FIG. 11, the side panels 664 may be hard plastic (TPO, TPE, etc) and may also be encapsulated within fabric panels. Optionally, the upper panel 658 and front panel 662 (either or both) may also be hard plastic (TPO, TPE, etc) and may also be encapsulated within fabric. Again a strap 660 or tether, such as seatbelt webbing, can be secured to the front of the hood 656 and to structure within the vehicle near the instrument panel.

Figure 12:
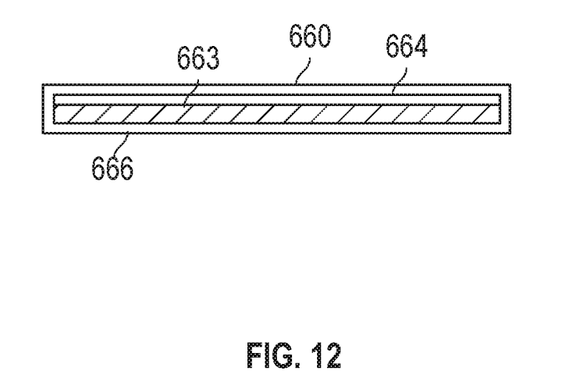
FIG. 12 is a section view of the hood of FIG. 11.

FIG. 12 is a section view through one of the side panels 664 of the hood of FIG. 11. Each side panel 664 may include a rigid plastic panel 663 encapsulated by fabric 666. The strap 660 may be secured to the side panel 664. Prior to deployment, the encapsulated plastic panels 663 would be flat on the airbag cushion 30, by folding the upper panel 658 and front panel 662 (FIG. 11), which are fabric.

Figure 13:
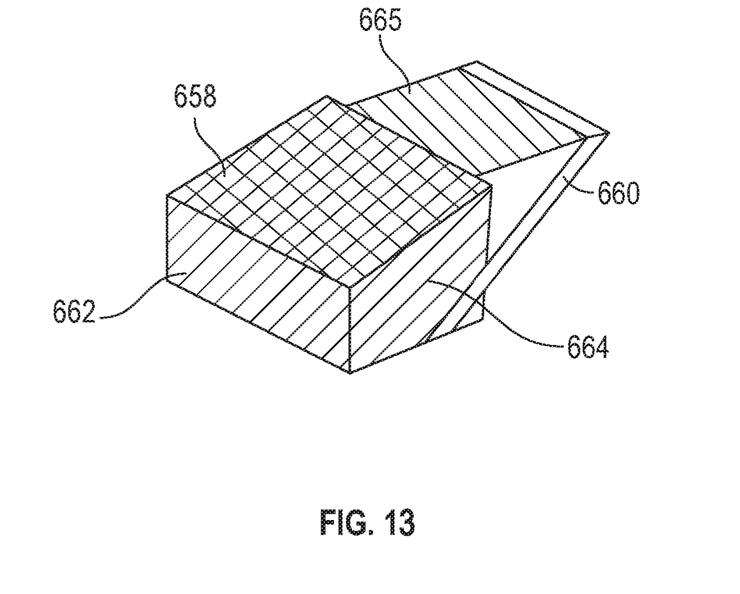
FIG. 13 shows the hood of FIG. 11 with an optional extension panel.

Optionally, an extension panel 665 (fabric and/or plastic—TPO, TPE, etc) as shown in FIG. 13 can be attached to upper panel 658. The extension panel 665 extends rearward from a rearward end of the upper panel 658. A strap 660, such as seatbelt webbing, is sewn/attached towards the rear end of the extension panel such that it limits the rotation of the extension panel 665.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A vehicle occupant restraint system comprising:
an airbag cushion; and
a reaction surface configured to move between a retracted position and a deployed position upon deployment of the airbag cushion, such that the reaction surface will direct the airbag cushion toward an occupant area upon deployment of the airbag cushion wherein the reaction surface is provided by a hood that includes a plurality of rigid panels flexibly connected to one another.

2. The vehicle occupant restraint system of claim 1 further including a strap secured to one of the plurality of rigid panels.

3. The vehicle occupant restraint system of claim 1 further including a tether secured to one of the plurality of rigid panels and configured to be pulled taut during deployment of the airbag cushion.

4. The vehicle occupant restraint system of claim 3, wherein the tether is a flexible strap that is secured to a fixed vehicle component.

5. A vehicle occupant restraint system comprising:
an airbag cushion;
a hood configured to direct the airbag cushion toward an occupant area upon deployment of the airbag cushion, wherein the hood includes a front panel, an upper panel extending rearward from the front panel, a first side panel connecting a first end of the upper panel to a first side of the front panel, and a second side panel connecting a second side of the upper panel to a second end of the front panel, wherein the first side panel and the second side panel each include a rigid plastic panel within fabric; and a strap secured to a rearward end of the hood.

6. The vehicle occupant restraint system of claim 5 wherein the hood is configured such that upon deployment of the airbag cushion the rearward end of the hood will move upward more than a forward end of the hood such that the hood will direct the airbag cushion toward the occupant area upon deployment of the airbag cushion.

7. The vehicle occupant restraint system of claim 5 wherein the occupant area is rearward of the airbag cushion and wherein the hood includes an extension panel extending rearward from the upper panel and extending rearward of the first side panel and the second side panel.

8. The vehicle occupant restraint system of claim 7 wherein the extension panel includes a rigid panel inside the fabric.

9. The vehicle occupant restraint system of claim 8 wherein the hood is configured such that upon deployment of the airbag cushion the rearward end of the hood will move upward more than a forward end of the hood such that the hood will direct the airbag cushion toward the occupant area upon deployment of the airbag cushion.

10. A vehicle occupant restraint system comprising:
an airbag cushion;
a hood configured to direct the airbag cushion toward an occupant area upon deployment of the airbag cushion, wherein the occupant area is rearward of the airbag cushion, wherein the hood includes an upper panel, a first side panel connected to a first side of the upper panel, a second side panel connected to a second side of the upper panel, and an extension panel extending rearward from the upper panel; and
a strap secured to the extension panel.

11. The vehicle occupant restraint system of claim 10 wherein the upper panel, the first side panel, and the second side panel are fabric.

12. The vehicle occupant restraint system of claim 10 wherein the extension panel extends rearward of the first side panel and the second side panel.

13. The vehicle occupant restraint system of claim 12 further including a front panel, wherein the upper panel extends rearward from the front panel.

14. The vehicle occupant restraint system of claim 13 wherein the first side panel is connected to a first side of the front panel and wherein the second side panel is connected to a second side of the front panel.

15. The vehicle occupant restraint system of claim 10 wherein the extension panel includes a rigid panel inside fabric.

16. The vehicle occupant restraint system of claim 15 wherein the hood includes a rigid panel inside fabric.

17. The vehicle occupant restraint system of claim 16 wherein the first side panel and the second side panel each include a rigid panel inside the fabric.

18. A vehicle occupant restraint system comprising:
an airbag cushion; and
a reaction surface configured to move between a retracted position and a deployed position upon deployment of the airbag cushion, such that the reaction surface will direct the airbag cushion toward an occupant area upon deployment of the airbag cushion, wherein the reaction surface is connected by side panels to rods clipped to the reaction surface.

19. The vehicle occupant restraint system of claim 18 wherein the reaction surface is provided by a section of instrument panel skin, the section of the instrument panel skin connected by the side panels to the rods, wherein the rods are clipped to the section of the instrument panel skin.

* * * * *